Nov. 1, 1927.　　　　　　　　　　　　　　　　　1,647,170
J. J. BARRY
FILLETING MACHINE
Filed May 28, 1926　　　　　　4 Sheets-Sheet 1
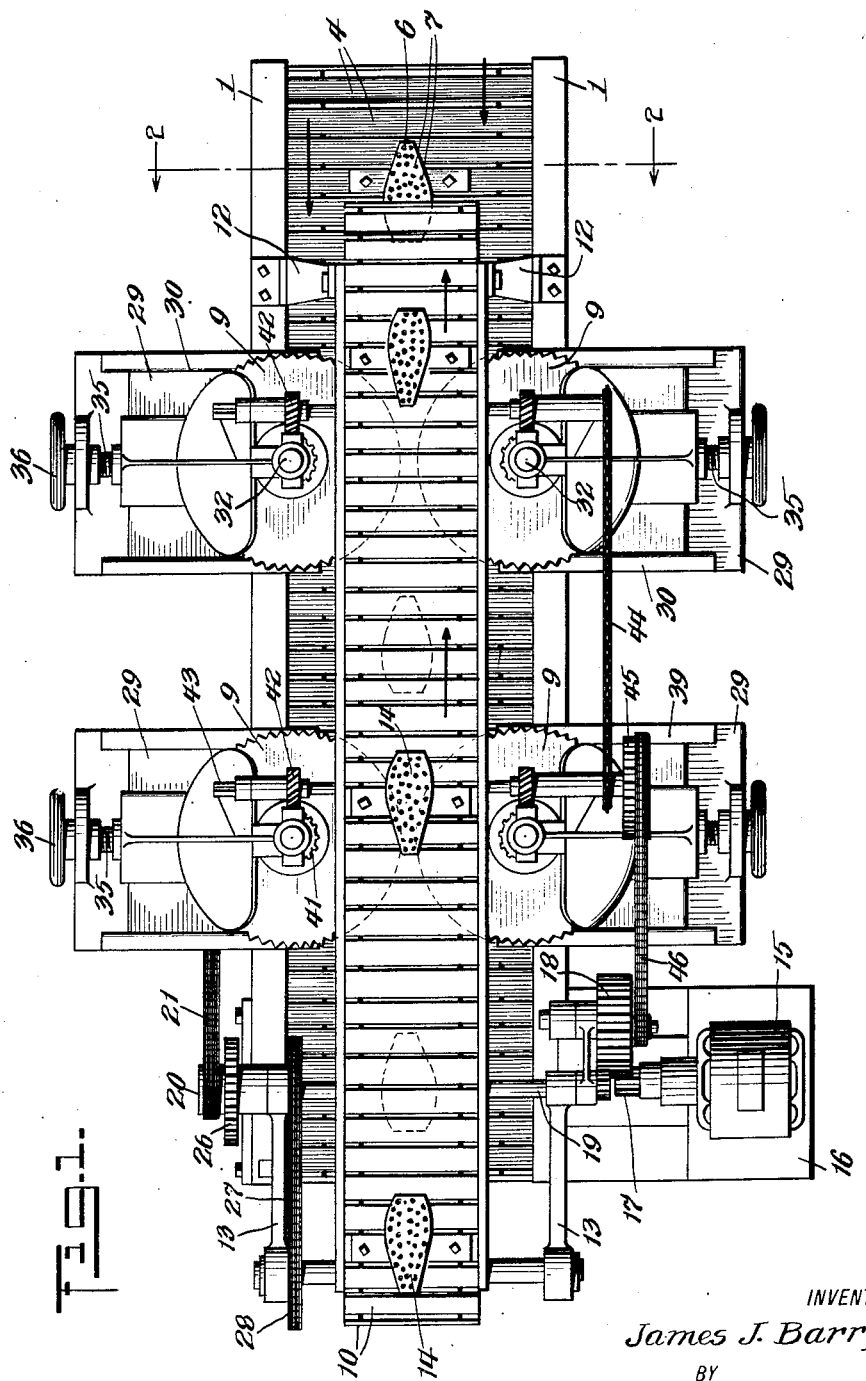
INVENTOR
James J. Barry
BY
Howard P. King
ATTORNEY

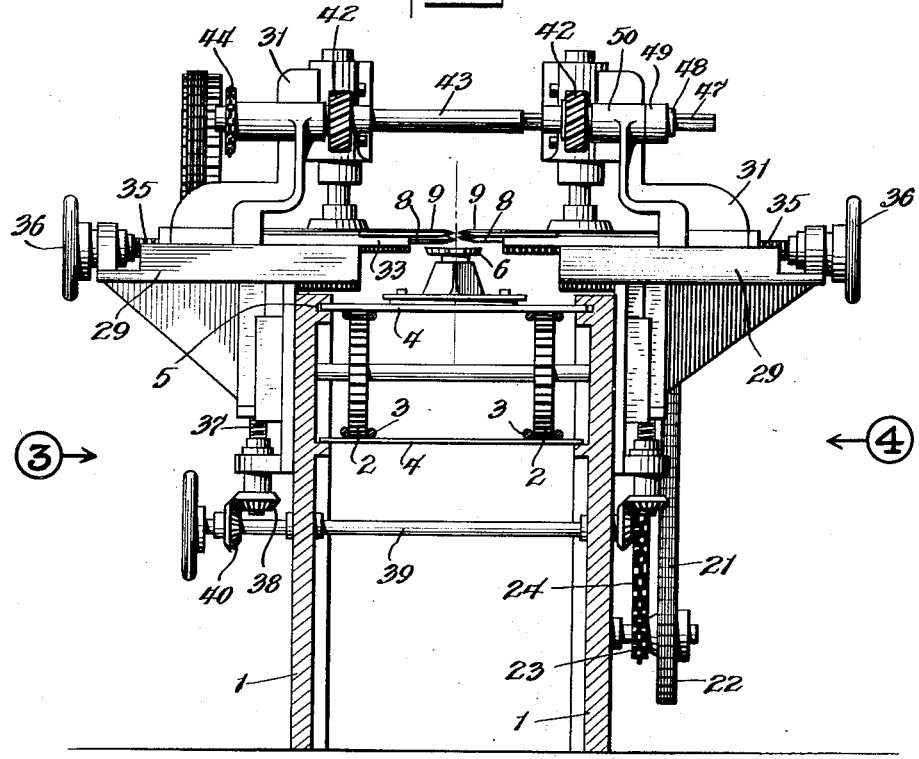

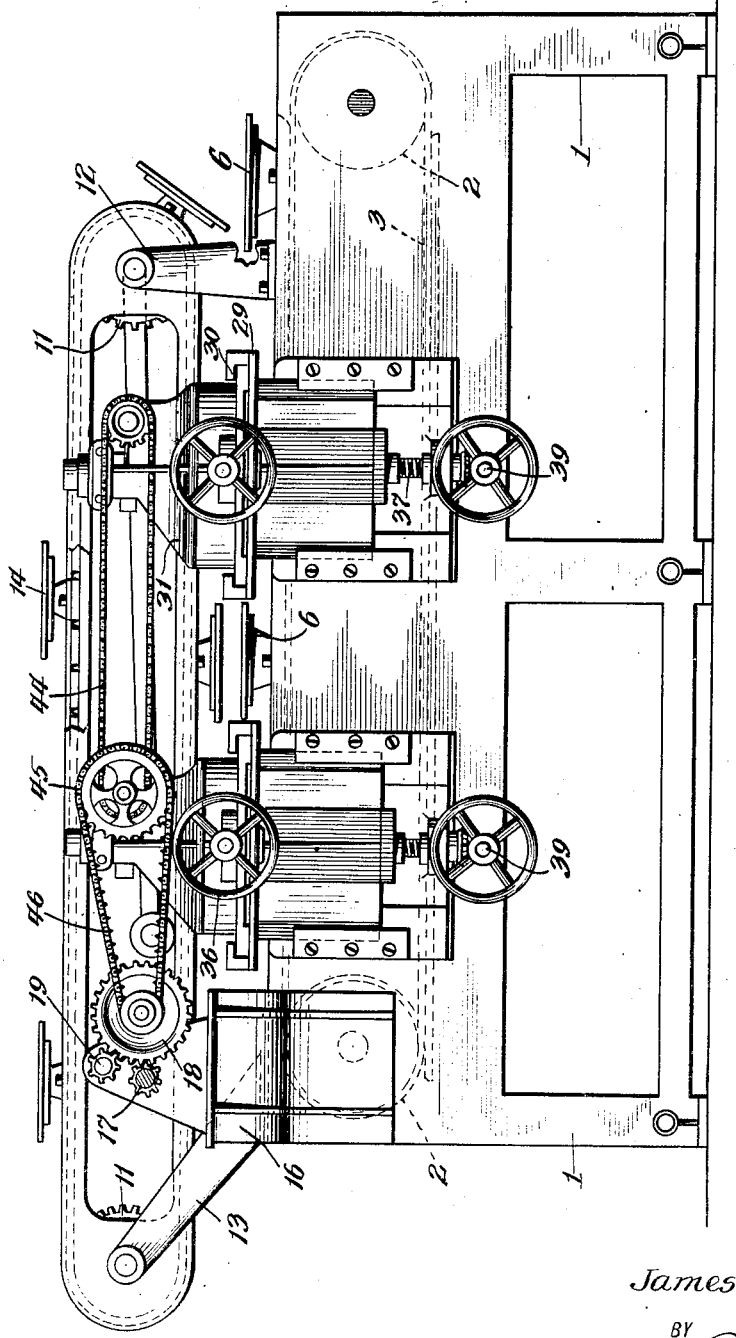

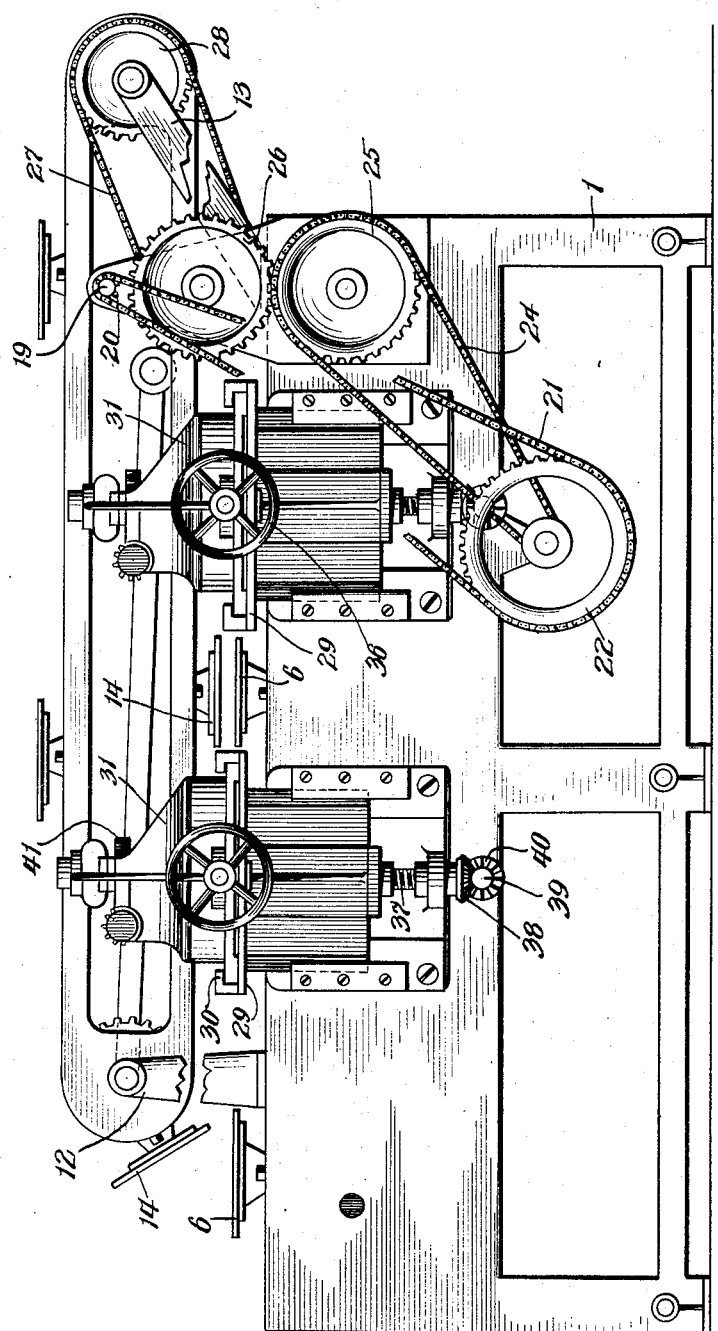

Patented Nov. 1, 1927.

1,647,170

UNITED STATES PATENT OFFICE.

JAMES J. BARRY, OF GLOUCESTER, MASSACHUSETTS, ASSIGNOR TO GENERAL SEA-FOODS CORPORATION, OF GLOUCESTER, MASSACHUSETTS, A CORPORATION OF DELAWARE.

FILLETING MACHINE.

Application filed May 28, 1926. Serial No. 112,228.

This invention relates to filleting machines and more particularly to machines for automatically filleting fish for removing the backbone from the fish.

The objects of the invention are to provide a filleting machine which will fillet fish of a flat nature such as flounders; to provide a machine which will remove the fish flesh from both sides of the back-bone during a single passage of the fish through the machine; to obtain the cutting and feeding to the cutters entirely automatically; to avoid any necessity for the operator to have his hands in the vicinity of the cutters; to provide for accurate adjustment of the cutters both in relation to the thickness of the fish and the width to be cut; to retain the fish in position as it is fed through the machine; to secure simplicity of construction and operation and to obtain other advantages and results as may be brought out in the following description.

Referring to the accompanying drawings in which like numerals of reference indicate similar parts throughout the several views;

Figure 1 is a plan view of a machine embodying my invention;

Figure 2 is a cross-sectional view on line 2—2 of Fig. 1 except that the pressure conveyor is omitted;

Figures 3 and 4 are elevations looking at opposite sides of the machine;

Figure 5 is a transverse sectional view centrally through the cutter and associated parts; and Figure 6 is a sectional view on line 6—6 of Fig. 5.

In the specific embodiment of the invention illustrated in said drawings, the reference numerals 1, 1 indicate appropriate side housings similar to each other and secured rigidly and spaced in parallel relation. At each end of the said housings are rotatably mounted suitable sprockets or other rotatable supports 2, 2 for a conveyor which preferably consists of a pair of longitudinal chains 3 extending from end to end of the machine around the sprockets, with metallic or other cross slats 4 carried by the chains with the ends of the slats riding in appropriate grooves 5 in the side housings 1. By mounting the ends of these cross slats in grooves, as clearly indicated in Figures 1, 2 and 5, the upper reach of the conveyor is fixed as to its vertical position, which is an important consideration in connection with the relation of the cutters to the fish as will be hereinafter more fully explained.

While it is within the scope of the invention to lay the fish directly upon the slats of the conveyor, I prefer to provide definite supports 6 for the fish, which supports are at separated intervals and are secured to the slats. The use of these supports 6 not only enables the operator to place the fish quite accurately without any considerable attention, but also enables the fish to be held more easily against sliding from position, and also from a mechanical standpoint, enables the machine to be more easily manufactured with sufficient space for the knives and other parts used in connection with the conveyor. The interval between the supports may be varied to suit requirements of the machine and the speed with which it is to be operated. Preferably the support is hollowed out to an appropriate shape for receiving the type of fish upon which the machine is to operate, so as to provide a support for the major portion of the fish and enable the backbone to be substantially flat. I likewise find it advantageous to provide some means for preventing fish from slipping which may be by means of a plurality of holes 7 in the support for obtaining a so-called vacuum grip on the fish.

Above the conveyor and preferably parallel thereto, are a plurality of cutters. These cutters preferably comprise a fixed blade 8 on top of which is a rotatable blade 9. The fixed blade provides an arcuate cutting edge having the same radius and center as the rotatable blade, and both blades are preferably toothed after the manner of a saw, and are in flatwise engagement with each other so as to sheer the fish flesh as it is presented to the blades. As shown, I provide a pair of cutters which operate at opposite sides of the machine so the spinal portion of the backbone of the fish will pass between the edges of the cutters and the flesh will be sheered from the backbone up to said spinal portion. One pair of these cutters will operate at the top of the backbone and the other pair are in a lower plane, as shown in Figure 2, so as to sheer the flesh from the bottom of the backbone and thus sever the fillets from top and bottom of the fish. By way of illustration, the cutters engaged by the fish first are adjusted to sheer from the top of the backbone and those which the fish next engage sheer from the bottom of the backbone as the fish passes through the machine, but obviously this adjustment may be reversed, and especially so in view of the fact that means are provided for readily making adjustment for the cutters which will subsequently be described.

As the fish passes through the machine it is desirable to positively hold the same downwardly upon its support, which may be done by means of an upper pressure conveyor overlying the lower or transmission conveyor and suitably spaced therefrom. While direct engagement of the conveyor with the fish may be also untilized in this instance, it is within the scope of the invention to employ pressure units for that purpose as shown in Figures 1, 3 and 4. Referring to the pressure conveyor in more detail, it is to be observed that the same comprises a plurality of transverse slats 10, on a suitable endless chain or other flexible connection and passing around rotatable members such as sprockets 11 thereby providing an upper and lower reach for said pressure conveyor. The sprockets 11 are supported on suitable brackets 12, 13 from the housing and the slats 10 carry pressure members 14 at intervals corresponding to the intervals of the transmission fish supports, synchronized therewith so the same will register and engage a fish for passing the fish through the machine.

A suitable train of gearing or combined use of gearing, sprockets and chains may be employed for driving both of the conveyors and keeping the same in proper synchronism. The specific drive shown herein comprises a motor 15 mounted on a suitable shelf 16 and having a pinion 17 in mesh with a gear 18 in turn in mesh with another pinion on a drive shaft 19 extending to the other side of the machine. At that end of the shaft 19 is a sprocket 20 with chain 21 driving an idler sprocket 22 for reducing speed and in turn rotating an attached smaller sprocket 23 with chain connection 24 to another large sprocket 25 on the drive shaft for the transmission conveyor. A gear on said drive shaft in mesh with another gear 26 on a stub shaft also carrying a sprocket, drives, by means of a chain 27, another sprocket 28 on the drive shaft of the pressure conveyor. The cutters are each mounted by means of a vertically adjustable table 29 which provides a horizontal slideway 30 for a slidable bearing or hanger 31. Said hanger 31 supports a vertical rotatable shaft 32 on the lower end of which is mounted the rotatable blade 9 of the cutter. Said hanger 31 also provides an inwardly directed flange 33 which underlies said rotatable blade and provides a support for the fixed blade 8 which is secured on the top of said flange in engagement with the rotatable blade. An adjusting screw 35 and hand wheel 36 provide means for shifting the hanger 31 back and forth on the table and holding said hanger in adjusted position. Obviously as the hanger is moved back and forth, the blades are moved likewise. The table is movable up and down in its slideway, this operation being effected by a vertically disposed screw 37. On the bottom of each of these screws 37 are bevel gears 38, and for each opposed pair of cutters and associated parts there is provided a cross shaft 39 with bevel gears 40 in mesh with the bevel gears 38 on the adjusting screws so that vertical adjustment of the cutters is obtained simultaneously for both cutters of the pair.

The rotatable cutter 9 is driven by means of a spiral gear 41 mounted thereon in turn driven by a meshing spiral gear 42 on a cross-shaft 43 extending between the hangers 31 for the pair of cutters. On one end of said cross-shaft 43 is a sprocket which is driven by a chain 44 between the shafts of the two pairs of hangers. The cross-shaft 43 nearest the motor is provided with a driving sprocket 45 in turn driven by a chain 46 from a suitable sprocket driven by the motor. By this means all of the rotatable blades will be operated simultaneously. In order to accommodate the transverse adjustment of the hangers, said shaft 43 extending between the said hangers is provided with a feather or keyed connection 47 to a sleeve 48 on which is mounted the spiral gear 42. Said sleeve is provided with a collar 49 on its outer end so that said collar 49 retains a sleeve against sliding with respect to its bearing 50 in one direction and the gear prevents sliding of the sleeve in the opposite direction. Consequently as the hanger is moved back and forth the gear retains its proper relation to the gear which it is driving and at the same time is actuated by the said shaft 43.

It is to be noted in connection with the use of the present machine, that the fish is carried at a precise level and fed to the cutters which can be adjusted with great accuracy. It is therefore possible to sever the fish flesh from the backbone of the fish with minimum flesh left adhering to the bone. At the same time, the cutters are adjusted so as to almost invariably enter with the fish on the proper side of the backbone even for varying thicknesses of the fish within moderate ranges, so that it is not necessary to assort the fish except as to sizes of very great difference.

Obviously other detail changes and modifications may be made in the construction and operation of my improved filleting machine, but I do not wish to be understood as limiting myself to the exact construction shown except as set forth in the following claims when construed in the light of the prior art.

Having thus described the invention, I claim:—

1. A filleting machine comprising a traveling support hollowed at its top to receive a fish on its side with the backbone thereof in substantially horizontal position, and cutters above the plane of travel of said hollowed support, said cutters arranged horizontally and in planes above and below the plane of the horizontally positioned backbone of the fish so as to sever the flesh from the bone from side to side and end to end of the fish.

2. A filleting machine comprising a traveling support for a fish, and cutters arranged above the path of travel of said support and in the path of travel of the fish to cut above and below the backbone at both sides of the fish.

3. A filleting machine comprising a traveling support for a fish, and vertically adjustable cutters arranged above the path of travel of said support and in the path of travel of the fish to cut above and below the backbone at both sides of the fish.

4. A filleting machine comprising a traveling support for a fish, and horizontally adjustable cuters arranged above the path of travel of said support and in the path of travel of the fish to cut above and below the backbone at both sides of the fish.

5. A filleting machine comprising a traveling support for a fish, and cutters adjustable both horizontally and vertically arranged above the path of travel of said support and in the path of travel of the fish to cut above and below the backbone at both sides of the fish.

JAMES J. BARRY.